United States Patent Office 3,388,586
Patented June 18, 1968

3,388,586
POROSIMETER
Maurice Golmard, Dijon, and Michel Zanni, Bandol, France, assignors to Commissariat à l'Energie Atomique, Paris, France
Filed Jan. 5, 1965, Ser. No. 423,564
Claims priority, application France, Jan. 14, 1964, 960,225
1 Claim. (Cl. 73—38)

ABSTRACT OF THE DISCLOSURE

This invention relates to a porosimeter for measuring the size distribution of the pores of a sample material. Particularly, the invention relates to a method and apparatus for determining the open pore volume of a sample by measuring the volume of a non-wetting liquid, such as mercury, which is required to fill the pores.

---

This method consists in eliminating the gas contained within the pores of the sample by vacuum degassing and in then causing mercury to penetrate into the pores by capillarity under the action of increasing pressure. The volume of mercury which has penetrated into the pores is recorded as a function of the pressure. There is thus obtained a characteristic curve of size-distribution of the pores of the sample undergoing analysis.

The devices which have been employed for the purpose of determining the open pore volume of a sample in accordance with this method usually consist of a chamber in which the sample is placed and which is connected by means of conduits fitted with valves, on the one hand to a pump set and on the other hand to a mercury source.

The devices referred to possess a number of defects. In the first place, the conduits which are provided with elbows are deformed under the action of high pressures and modify the results of measurements. In the second place, valves are sources of leakage which alter the values of penetration of mercury. As a consequence, these devices lack fidelity and call for difficult and frequent adjustments which have to be performed by highly specialized personnel.

The aim of this invention is to overcome these disadvantages. Accordingly, the invention is concerned with a porosimeter for determining the size distribution of pores of a sample by penetration of a non-wetting liquid such as mercury into the pores under the action of a variable pressure, comprising a chamber which is closed off by a removable cap and by a plunger, means for causing said plunger to pass into the interior of said chamber and causing the volume of said chamber to vary, means for introducing a non-wetting liquid within said chamber and means for measuring the pressure of said liquid within said chamber, characterized in that said cap is provided with at least one opening for establishing communication with means for creating a vacuum within the chamber and for eliminating gas from a sample placed in said chamber, a first sealing gasket which ensures leak-tightness with respect to external agents and which leaves the chamber in communication with means for creating a vacuum in respect of a first position of the cap and a second sealing gasket for isolating said opening from said chamber in respect of a second position of said cap.

Referring to FIGS. 1 and 2 of the accompanying drawings, there will be described below one particular form of embodiment of the device according to the invention, which has been chosen solely by way of illustrative example.

Figure 1:
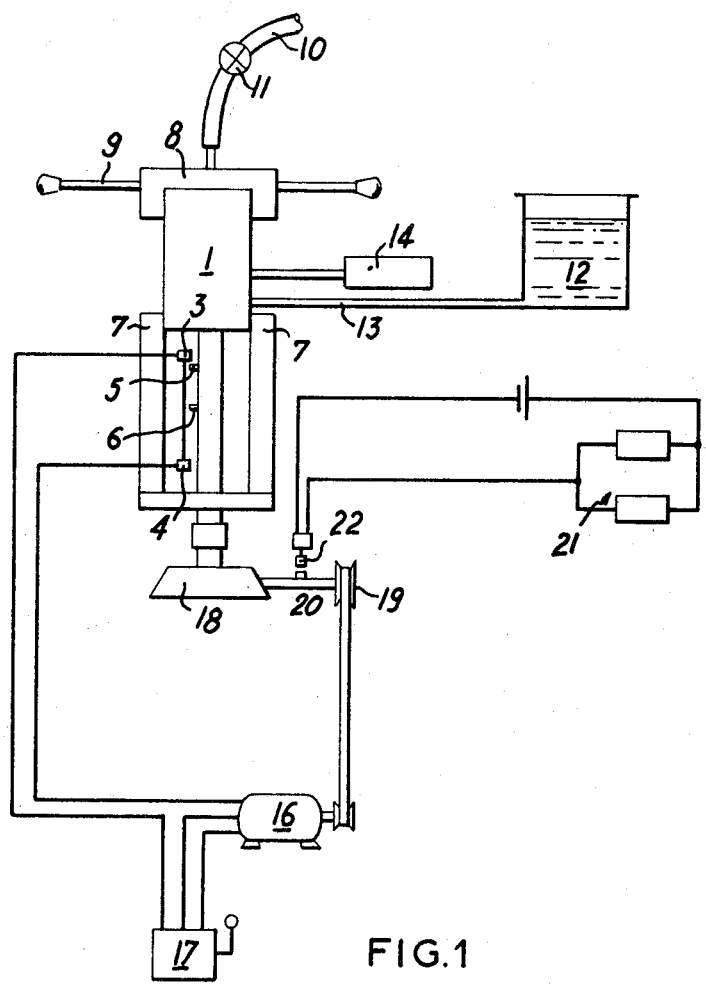
FIG. 1 shows diagrammatically the general arrangement of the mercury porosimeter according to the invention.

The porosimeter comprises a vertical cylinder 1 within which is formed an internal chamber and into which is adapted to penetrate a plunger so as to determine the volume of said chamber. The stroke of the plunger 2 is limited by two microcontacts 3 and 4 which are adapted to come respectively into contact with two cams 5 and 6 carried by the plunger 2. The cylinder 1 is supported on a frame 7 and is closed at the top by a cap 8 which is actuated by means of a clamping lever 9. The conduit 10 of a vacuum pump passes through said cap 8 and is fitted with an end-of-filling valve 11.

A mercury feed tank 12 communicates with the cylinder 1 through an admission pipe 13. The porosimeter is also fitted with a recording pressure gauge 14 (for example a pressure gauge of the variable induction type).

The plunger 2 is driven by a motor 16 which is controlled by means of a change-over switch 17 and which operates the plunger through the intermediary of a reduction gear unit 18. The input pulley 19 of the reduction gear unit is provided with a cam 20 which actuates a pulse-counting unit 21 by means of a microswitch 22. There thus corresponds to each pulse a predetermined displacement of the plunger 2 and consequently a predetermined variation in volume of the internal chamber 23 of the cylinder 1.

Figure 2:
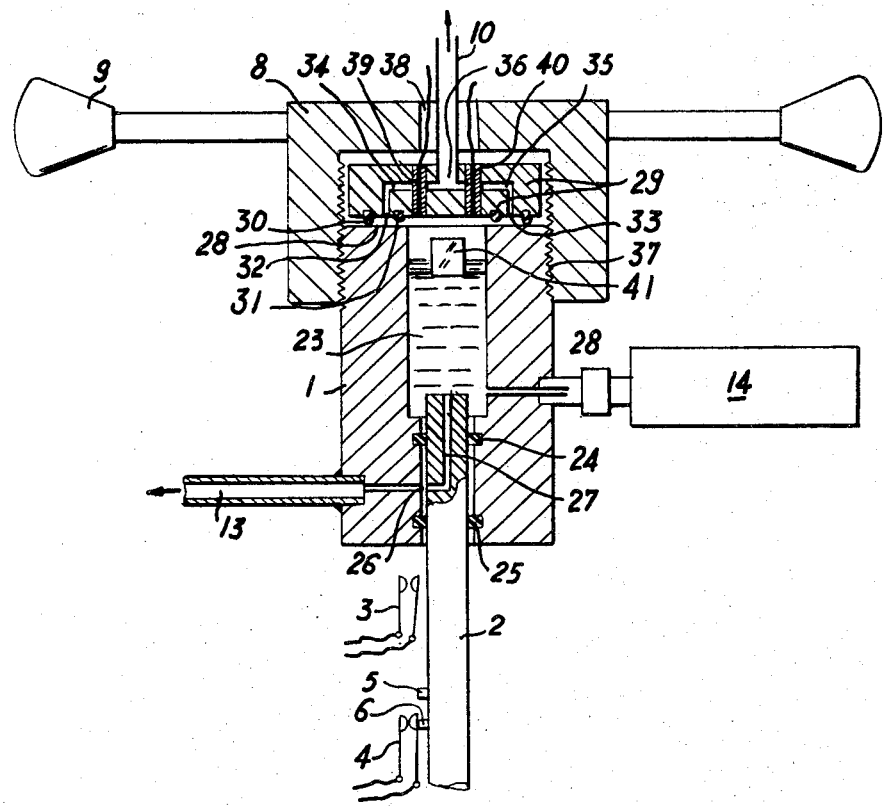
FIG. 2 shows the constructional detail of the porosimeter body.

As appears from FIG. 2, the chamber 23 which has walls of substantial thickness becomes narrower at the bottom portion thereof so as to form a passageway for the plunger 2. There are formed in the walls of said passageway two circular grooves 24 and 25 in which are fitted two O-ring seals for the purpose of ensuring leak-tightness of the chamber 23 with respect to external agents.

The pipe 13 for the supply of mercury terminates between the above-mentioned grooves. A passage 27 which corresponds to said supply pipe 13 and which is formed in the interior of the plunger has its opening on the top face of said plunger, in the interior of the chamber 23. In FIG. 2, the cam 6 is shown as closing the contact 4, thus limiting the back stroke of the plunger 2. The position of said plunger then corresponds to the position in which the mercury-supply pipe 13 is located in oppositely facing relation to the passage 27. Conversely, when the plunger 2 is caused to move towards the interior of the chamber 23, fluid-tightness between the mercury-supply pipe 13 and the chamber 23 is ensured by means of the upper O-ring seal 24 as soon as the opening of the passage 27 passes beyond said seal.

Fluid-tightness at the top of the chamber 23 and the connection of this latter with the vacuum system are ensured by means of a cover 29. There are formed in the underface of said cover, above the annular top face 28 of the wall of cylinder 1, two concentric grooves which are intended to accommodate O-ring seals. An annular gasket or O-ring seal 30 having substantial thickness and a low degree of hardness is fitted in the outer groove and approximately one-third of the thickness of said seal projects from the underface of the cover. There is fitted within the inner groove an O-ring seal 31 which has a much smaller transverse cross-sectional area and a higher degree of hardness.

Welded conduits 34 and 35 are pierced in the mass of the cover 29 and terminate at one end in outlets 32 and 33 respectively which are located between the two grooves 30 and 31. At the other end, said conduits 34 and 35 both terminate in the conduit 10 which is connected to the vacuum system and which is welded to the cap 29. In the drawing, the cross-section is taken in the plane of the conduits 34 and 35.

At the time of putting the porosimeter into service, the sealing rings 30 and 31 are flattened by compression against the top face 28 of the wall of chamber 23, said face being perfectly trued and burnished for this purpose. The flattening by compression is produced at the proper moment by the cap 8 in which is formed an internally threaded portion 37 which is screwed on an externally threaded portion of the cylinder 1. The said cap 8 is pierced with an opening 38 which provides a passageway for the tube 10 and is fitted with a clamping lever 9.

Two suitably insulated electrodes 39 and 40 are passed through the cover 29 and stop at the level of its internal surface. Said electrodes are connected to a visual indicator which has not been shown in the drawings and which lights up when the level of mercury within the chamber 23 reaches the two electrodes.

The operation of the apparatus takes place as follows:

When the sample 41 to be analyzed has been placed in the top portion of the chamber 23, the cover 29 is placed over the cylinder 1, the cap 8 is then brought into contact with the cover 29 without being forcibly applied against this latter (a clearance of a few millimeters can even be allowed to remain between the cover and the cap). The cover 29 thus simply rests on the body 1 with interposition of the O-ring seal 30; the pumping outlets 32 and 33 are therefore in communication with the chamber 23.

The pumping operation can then commence, since the outer seal 30 provides sufficient fluid-tightness. The purpose of this operation is to eliminate gas from the sample in such a manner as to permit the subsequent penetration of the mercury into the pores of the sample. At the same time, the mercury enters the chamber 23, the plunger 2 being at the bottom of its stroke and the passage 27 being located opposite the opening 26 for the admission of mercury. The mercury which is thus admitted at the bottom of the chamber 23 drives air bubbles out of the chamber ahead of the liquid as this latter rises and thus prevents any danger of occluded air. As a further consequence, there is no danger of introduction of air bubbles which are found to be present in devices wherein mercury is supplied through a high-pressure valve which is subject to leakage.

When the level of the sample which is placed in the top of the chamber 23 is reached, the vacuum is sufficient (usually lower than 1 mm. Hg) to ensure that gas is completely eliminated from the sample. After having surrounded the sample, the mercury reaches the underface of the cover 29 and then closes the circuit between the two electrodes 39, 40, whereupon the visual indicator is lighted up. The valve 11 of the vacuum system is then closed after the outer and inner sealing joints 30 and 31 have been completely flattened by compression with the aid of the clamping lever 9. Leak-tightness of the chamber 23 with respect to the pumping system is thus ensured.

Determination of porosity can then be performed by initiating the operation of the plunger 2. As soon as the opening 27 passes beyond the sealing ring 24, the chamber 23 is isolated from the mercury tank 12 and the pressure rises within the chamber 23.

The mercury penetrates by capillary attraction within all of those pores of the sample which have a predetermined size, the size being variable according to the pressure.

Thus, the open pore volume of the sample can be characterized by the variations in volume of the mercury which has entered the sample as a function of the pressure which prevails within the chamber. The said variations in volume are in turn characterized by the forward motion of the plunger 2. The curve is automatically plotted by means of the recording pressure gauge 14, the advancing of which is coupled with the driven movement of the plunger through the intermediary of the pluse counter 21.

What we claim is:
1. A porosimeter comprising,
an elongated chamber adapted to hold a sample to be analyzed,
movable plunger means closing a first end of said chamber,
removable cap means having an opening therein for closing a second end of said chamber,
sealing means consisting of a first gasket interposed between said opening of said cap and a rim of the chamber and a second inner gasket for isolating the chamber from said opening upon depression of said cap,
vacuum means communicating with said opening for eliminating gas from within said chamber,
means for introducing a non-wetting liquid into said chamber, and
means for moving said plunger into said chamber in order to vary the volume thereof.

References Cited

UNITED STATES PATENTS

| | | | |
|---|---|---|---|
| 2,327,642 | 8/1943 | Horner | 73—38 |
| 2,874,565 | 2/1959 | Kelton | 73—38 |
| 2,886,964 | 5/1959 | Shapiro et al. | 73—38 |
| 3,022,657 | 2/1962 | Hampton | 73—38 |
| 3,158,020 | 11/1964 | Donaldson | 73—38 |

LOUIS R. PRINCE, *Primary Examiner.*

W. HENRY, *Assistant Examiner.*